US009689290B2

(12) United States Patent
Li et al.

(10) Patent No.: US 9,689,290 B2
(45) Date of Patent: Jun. 27, 2017

(54) REDUCTANT MIXING SYSTEM FOR AN EXHAUST GAS AFTER-TREATMENT DEVICE

(71) Applicant: GM GLOBAL TECHNOLOGY OPERATIONS LLC, Detroit, MI (US)

(72) Inventors: Jianwen Li, West Bloomfield, MI (US); Luciano Nunziato Di Perna, Troy, MI (US); Rahul Mital, Rochester Hills, MI (US); Roberto Argolini, Milan (IT); Joshua Clifford Bedford, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/955,629

(22) Filed: Dec. 1, 2015

(65) Prior Publication Data

US 2017/0152778 A1  Jun. 1, 2017

(51) Int. Cl.
*F01N 3/00* (2006.01)
*F01N 1/00* (2006.01)
*F01N 3/10* (2006.01)
*F01N 3/02* (2006.01)
*F01N 3/023* (2006.01)
*F01N 3/20* (2006.01)
(Continued)

(52) U.S. Cl.
CPC ............. *F01N 3/0231* (2013.01); *F01N 1/08* (2013.01); *F01N 1/083* (2013.01); *F01N 1/086* (2013.01); *F01N 3/206* (2013.01); *F01N 3/2066* (2013.01); *F01N 3/035* (2013.01); *F01N 2610/02* (2013.01)

(58) Field of Classification Search
CPC ...... F01N 3/0842; F01N 3/2066; F01N 13/02; F01N 2240/20; F01N 1/166; F01N 2610/00–2610/06; F01N 2610/102; F01N 1/08; F01N 1/082; F01N 1/083; F01N 1/086; F01N 1/088; F01N 3/06; F01N 3/10; F01N 3/206; F01N 3/208; F01N 3/0231; F01N 3/0232; F01N 3/035; F01N 3/0821; F01N 13/185; F02B 3/06
USPC .................. 60/286, 297, 301, 303, 311, 324
See application file for complete search history.

(56) References Cited

U.S. PATENT DOCUMENTS 7,533,522 B2 * 5/2009 Klein .................... B01D 53/90
60/274
8,683,783 B2 * 4/2014 Suzuki .................. B01D 53/90
60/286
(Continued)

Primary Examiner — Phutthiwat Wongwian
Assistant Examiner — Diem Tran
(74) Attorney, Agent, or Firm — Quinn IP Law

(57) ABSTRACT

An after-treatment (AT) system for a flow of exhaust gas of an internal combustion engine includes a first AT device and a second AT device in fluid communication with and positioned in the exhaust gas flow downstream of the first AT device. The AT system also includes an exhaust passage configured to carry the exhaust gas flow from the first AT device to the second AT device. The AT system additionally includes an injector configured to introduce a reductant into the exhaust passage. The second AT device includes an inlet cone having a volute defining a spiral primary path for the exhaust gas flow into the second AT device and configured to generate a swirling motion of and turbulence in the exhaust gas flow. A vehicle employing the AT system is also disclosed.

12 Claims, 4 Drawing Sheets

(51) Int. Cl.
*F01N 1/08* (2006.01)
*F01N 3/035* (2006.01)

(56) References Cited

U.S. PATENT DOCUMENTS

| | | | |
|---|---|---|---|
| 8,726,640 B2 * | 5/2014 | Tilinski | F01N 3/2066 60/286 |
| 8,991,155 B2 * | 3/2015 | Larose, Jr. | F01N 3/18 60/274 |

* cited by examiner

REDUCTANT MIXING SYSTEM FOR AN EXHAUST GAS AFTER-TREATMENT DEVICE

TECHNICAL FIELD

The present disclosure is drawn to a reductant mixing system for an exhaust gas after-treatment (AT) device employed by an internal combustion engine.

BACKGROUND

Various exhaust after-treatment (AT) devices, such as particulate filters and other devices, have been developed to effectively limit exhaust emissions from internal combustion engines. One of the exhaust after-treatment devices frequently used in a modern lean burn internal combustion engine, such as a compression-ignition type, is a selective catalytic reduction filter (SCRF).

The SCRF is configured to convert nitrogen oxides ($NO_x$) into diatomic nitrogen ($N_2$) and water ($H_2O$) with the aid of the $NO_2$ generated by another exhaust after-treatment device, typically the diesel oxidation catalyst (DOC). For effective removal of $NO_x$, the SCR conversion process additionally requires a predetermined amount of ammonia ($NH_3$) to be present in the exhaust gas flow.

The SCR conversion process may additionally require a controlled or metered amount of a reductant having a general name of "diesel-exhaust-fluid" (DEF) when the reductant is employed in diesel engines. Such a reductant may be an aqueous solution of urea that includes water and ammonia.

SUMMARY

An after-treatment (AT) system for a flow of exhaust gas from an internal combustion engine includes a first AT device and a second AT device in fluid communication with and positioned in the exhaust gas flow downstream of the first AT device. The AT system also includes an exhaust passage configured to carry the exhaust gas flow from the first AT device to the second AT device. The AT system additionally includes an injector configured to introduce a reductant into the exhaust passage. The second AT device includes an inlet cone having a volute defining a spiral primary path for the exhaust gas flow into the second AT device and configured to generate a swirling motion of and turbulence in the exhaust gas flow.

The volute can be at least partially formed by a gas flow deflector arranged inside the inlet cone.

The gas flow deflector can be configured to extend inside the inlet cone for a span in a range of 60-300 degrees.

The exhaust gas flow deflector may define at least one aperture configured to provide a secondary path for the exhaust gas flow through the gas flow deflector to generate additional turbulence in the exhaust gas flow.

The AT system may additionally include a mixer positioned within the exhaust passage downstream of the injector and configured to mix the reductant with the exhaust gas flow.

The injector may be positioned 70-150 mm from the mixer.

The exhaust passage may include an L-bend, the mixer may be positioned in a plane square to the flow of the exhaust gas within the exhaust passage, and the injector may be positioned upstream of the L-bend such that the reductant can be introduced along the flow of the exhaust gas and at an angle of 40-90 degrees with respect to the plane of the mixer.

The AT system may also include a controller configured to regulate the injector for introducing the reductant into the exhaust gas flow.

As disclosed, the internal combustion engine may be a compression-ignition engine, the reductant may be a diesel-exhaust-fluid (DEF) having an aqueous solution of urea, while the first AT device may be a diesel oxidation catalyst (DOC) and the second AT device may be a selective catalytic reduction filter (SCRF).

Specific construction of the second AT and a vehicle employing the above-described AT system are also provided.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
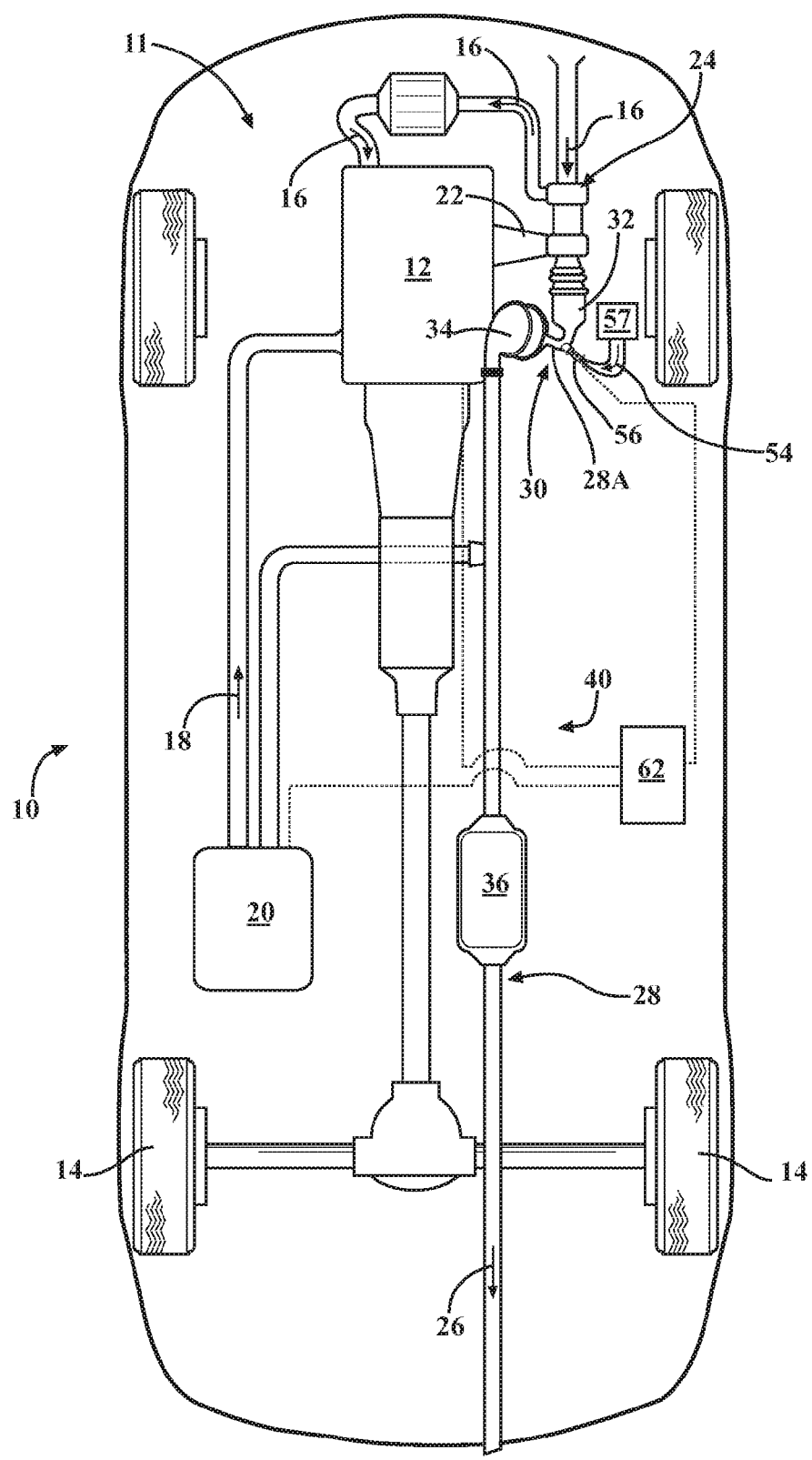
FIG. 1 is a schematic plan view of a vehicle having an internal combustion engine connected to an exhaust system having an after-treatment (AT) system with a number of AT devices for reducing exhaust emissions.

Referring to the drawings, wherein like reference numbers refer to like components throughout the several views, FIG. 1 schematically depicts a motor vehicle 10. The vehicle 10 includes an internal combustion engine 12 configured to propel the vehicle via driven wheels 14. Although the internal combustion engine 12 may be a spark-ignition type, specific reference throughout the ensuing disclosure will be made to a compression-ignition or diesel type of an engine. As understood by those skilled in the art, internal combustion in the diesel engine 12 occurs when a specific amount of ambient air flow 16 is mixed with a metered amount of fuel 18 supplied from a fuel tank 20 and the resultant air-fuel mixture is compressed inside the engine's cylinders (not shown).

As shown, the engine 12 includes an exhaust manifold 22 and a turbocharger 24. The turbocharger 24 is energized by a flow of exhaust gas, specifically the exhaust gas flow 26 released by individual cylinders of the engine 12 through the exhaust manifold 22 following each combustion event. The turbocharger 24 is connected to an exhaust passage 28A of an exhaust system 28 that receives exhaust gas flow 26 and eventually releases the gas flow to the ambient, typically on a side or aft of the vehicle 10. Although the engine 12 is depicted as having the exhaust manifold 22 attached to the engine structure, the engine may include exhaust passages (not shown) such as generally formed in exhaust manifolds. In such a case, the above passages may be incorporated into the engine structure, such as the engine's cylinder head(s). Furthermore, although the turbocharger 24 is shown, nothing precludes the engine 12 from being configured and operated without such a power augmentation device.

Figure 2:
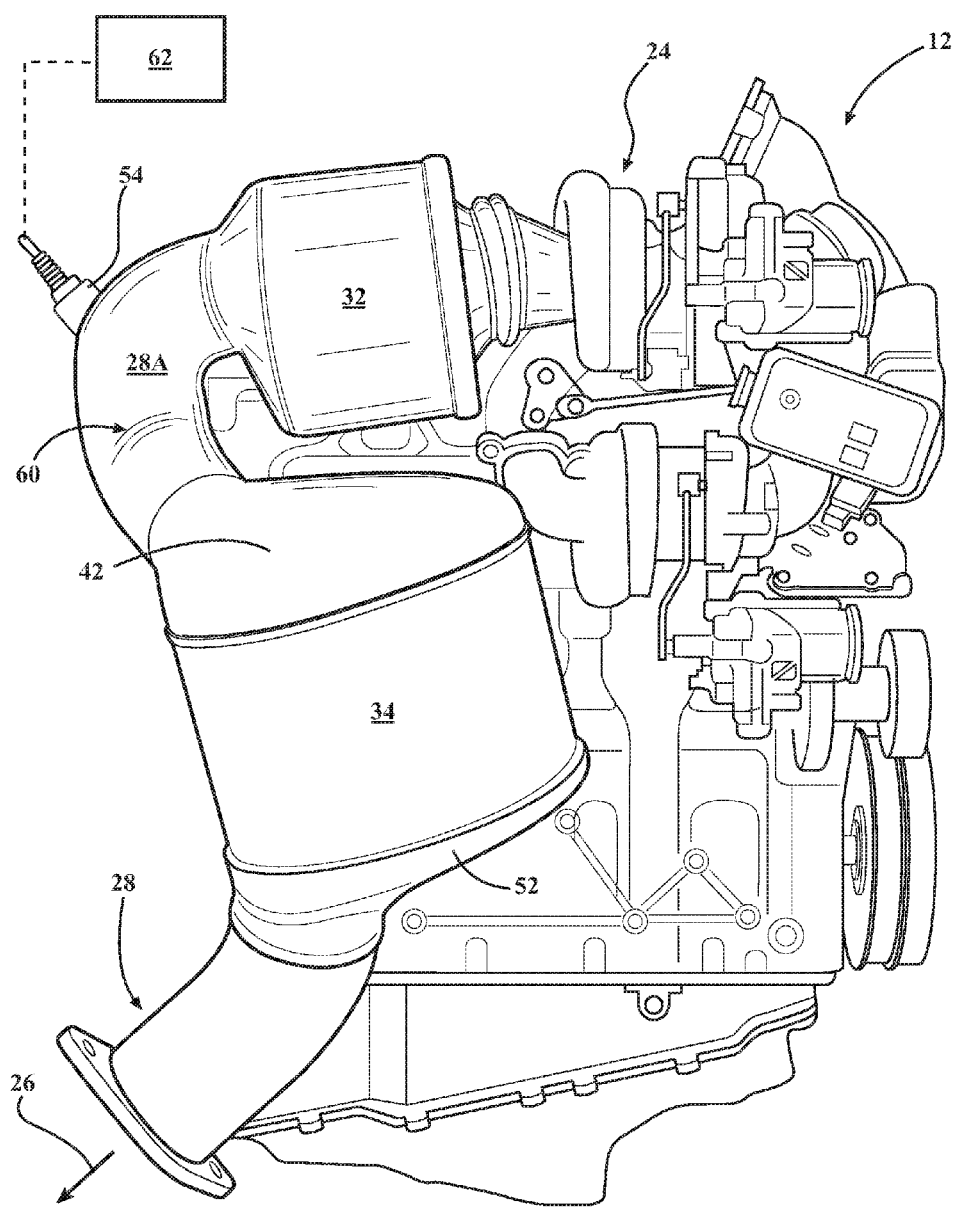
FIG. 2 is a schematic illustration of the internal combustion engine connected to the exhaust system with the after-treatment (AT) shown in FIG. 1.

The vehicle 10 also includes an engine exhaust after-treatment (AT) system 30. The AT system 30 includes a number of exhaust after-treatment devices configured to methodically remove largely carbonaceous particulate byproducts and emission constituents of engine combustion from the exhaust gas flow 26. As shown in FIGS. 1 and 2, the AT system 30 operates as part of the exhaust system 28. The AT system 30 includes a first AT device 32 close-coupled to the turbocharger 24 and a second AT device 34 positioned in the exhaust gas flow downstream and close-coupled to the first AT device. As employed herein, the term "close-coupled" with respect to the arrangement of the first and second AT devices 32, 34 denotes each of the subject devices being in close proximity to each other and arranged inside an engine compartment 11 of the vehicle 10 for close proximity to the engine 12. Such an arrangement of the first and second AT devices 32, 34 reduces length of the exhaust passage 28A for carrying the exhaust gas flow 26 from the first AT device 32 to the second AT device 34. Consequently, such close-coupling of the first and second AT devices 32, 34 to the engine 12 provides a compact packaging arrangement that minimizes time for activation of the AT system 30 in after-treatment of the exhaust gas flow 26 following a cold-start of the engine 12. As shown, the first AT device 32 may be a diesel oxidation catalyst (DOC), while the second AT device 34 may be a selective catalytic reduction filter (SCRF).

The primary function of the DOC is reduction of carbon monoxides (CO) and non-methane hydrocarbons (NMHC). When present, the DOC is additionally configured to generate nitrogen dioxide ($NO_2$), which may be used by the SCRF arranged remotely downstream of the DOC and described in greater detail below. The DOC typically contains a catalyst substance made up of precious metals, such as platinum and/or palladium, which function therein to accomplish the above-noted objectives. Generally, with respect to generation of $NO_2$, the DOC becomes activated and reaches operating efficiency at elevated temperatures. Therefore, as shown in FIG. 1, the DOC may be close-coupled to the turbocharger 24 in order to reduce loss of thermal energy from the exhaust gas flow 26 prior to the gas reaching the DOC.

The AT system 30 can also include a third AT device 36, which may be a lean $NO_x$ trap (LNT), an SCR, a rear oxidation catalyst (ROC) or a combination of the foregoing devices. Although in a separate embodiment of the AT system 30, and when the third AT device 36 is an LNT, the LNT can be positioned upstream of the DOC and receive the exhaust gas flow 26 directly from the engine 12. As shown, the LNT is positioned downstream of the SCRF. Typically, the LNT includes a ceramic honeycomb substrate structure with a catalyzed wash-coat, i.e., mixed with active precious metal, that is applied to channels of the substrate. The LNT is configured to reduce oxides of nitrogen or $NO_x$ that are emitted by the engine 12 in the exhaust gas flow 26 as a byproduct of the reaction of nitrogen and oxygen gases in the air following a combustion event. The LNT removes $NO_x$ molecules from the exhaust gas flow 26 by trapping and storing them internally during operation of the engine 12, thus acting like a molecular sponge.

In the embodiment where the first AT device 32 is the DOC and the second AT device 34 is the SCRF, after passing through the DOC, the exhaust gas flow 26 is directed to the SCRF via the exhaust passage 28A. The SCRF may be configured as a 1-way filter, which filters particulate matter or soot, or a 2-way filter, which includes a catalyzed wash-coat, and carries two functions—filters particulate matter and reduces $NO_x$. The SCRF is configured to convert nitrogen oxides ($NO_x$) into diatomic nitrogen ($N_2$) and water ($H_2O$) with the aid of the $NO_2$ generated by the DOC 32. An SCR catalyst can have a honeycomb, a plate, or a corrugated geometry. For effective removal of $NO_x$, the SCR conversion process additionally requires a predetermined amount of ammonia ($NH_3$) to be present in the exhaust gas flow 26 that is produced by the LNT 34 and fuel-rich exhaust gas flow 26.

Figure 4:
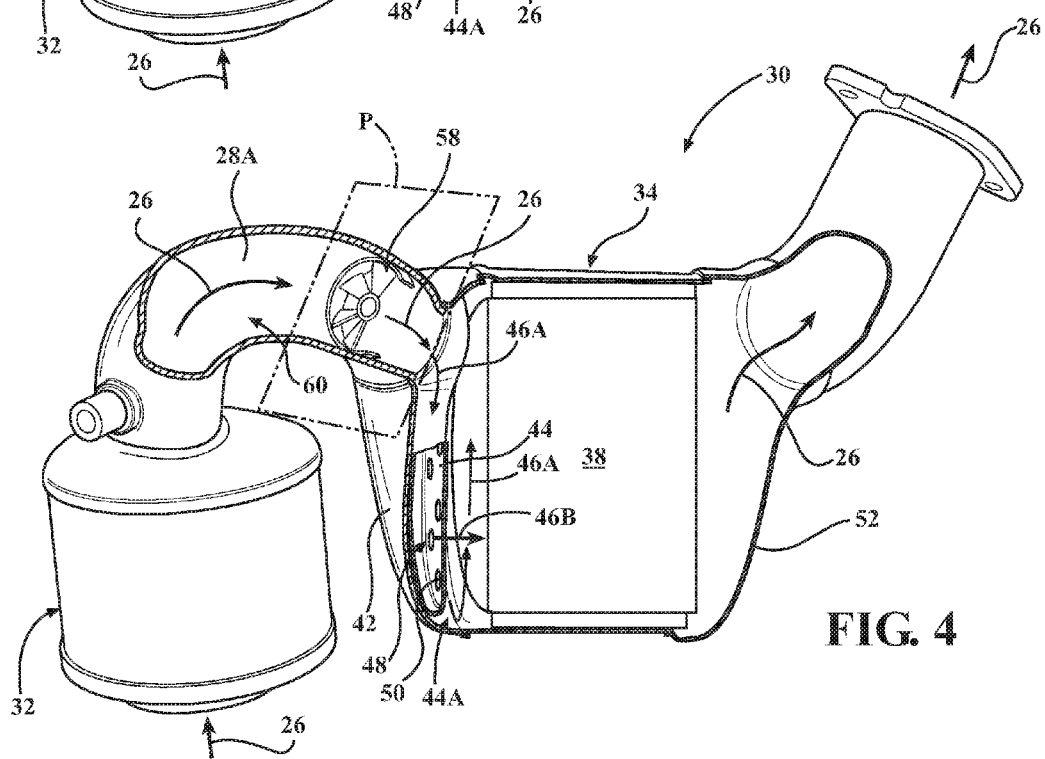
FIG. 4 is a schematic perspective partial cut-away view of the AT system shown in FIG. 1, illustrating the mixer arranged upstream of the exhaust flow deflector shown in FIG. 3.
Figure 5:
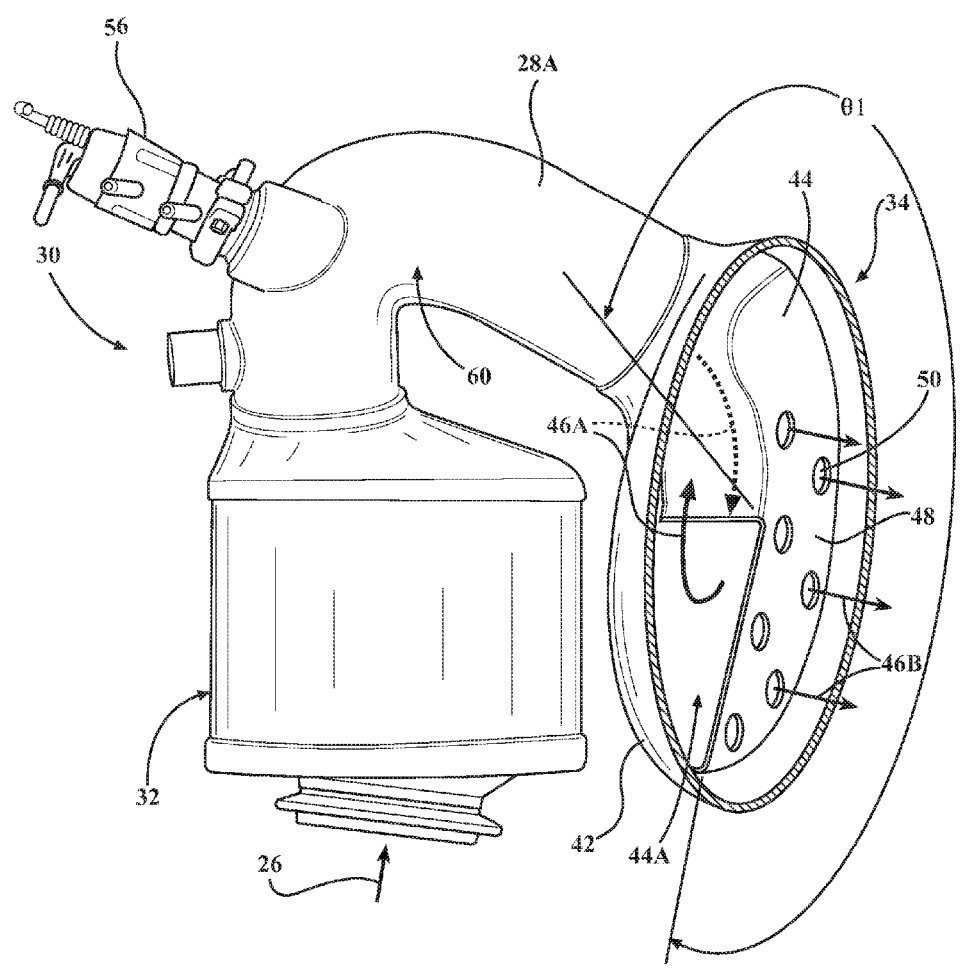
FIG. 5 is another schematic perspective partial cut-away view of the AT system shown in FIGS. 2-4.

As shown in FIG. 4, the second AT device 34 includes a catalyst body 38, i.e., a filter or catalyst brick, configured to catalyze the exhaust gas flow 26. The catalyst body 38 may have either the honeycomb, plate, or corrugated geometry described above with respect to the SCRF embodiment of the second AT device 34. The second AT device 34 also includes a housing 40 configured to hold and cover the catalyst body 38. An inlet cone 42 is connected to the housing 40 and configured to receive and collect un-catalyzed exhaust gas flow 26 and direct the un-catalyzed exhaust gas flow to the catalyst body 38 for filtering. The inlet cone 42 includes a volute 44. The volute 44 defines a spiral primary path 46A for the exhaust gas flow 26 into the catalyst body 38. The volute 44 is configured to generate a swirling motion of and turbulence in the exhaust gas flow 26. The volute 44 can be at least partially formed by a gas flow deflector 48 arranged inside the inlet cone 42. The gas flow deflector 48 and thereby formed volute 44 can extend inside the inlet cone 42 and define the spiral primary path 46A for a predetermined span or angle θ1 in the range of 60-300 degrees.

The gas flow deflector 48 may define one or more apertures 50 configured to provide a secondary path 46B for the exhaust gas flow 26 through the gas flow deflector. The secondary path 46B through the aperture(s) 50 is intended to generate additional turbulence in the exhaust gas flow 26 and thereby distribute the exhaust gas flow more uniformly across the inlet cone 42 and the face of the catalyst body 38 in the second AT device 34. The inlet cone 42, along with the gas flow deflector 48 establishing the volute 44, may be formed from a heat-resistant material such as stainless steel. The gas flow deflector 48 can be arranged inside the inlet cone 42 such that a cross-section 44A of the volute 44 gradually expands along the spiral primary path 46A of the exhaust gas flow 26 toward the catalyst body 38. Such gradually expanding volute cross-section 44A can provide increased coverage of the catalyst body 38 by the exhaust gas flow 26 after the exhaust gas enters the housing 40 from the inlet cone 42. The second AT device 34 also includes an outlet cone 52 connected to the housing 40 and configured to collect and release the catalyzed exhaust gas flow 26 from the second AT device for further processing along the exhaust system 28. The above structure of the inlet cone 42 is configured to promote more thorough mixing of the exhaust gas flow 26 for more efficient usage of the catalyst body 38.

As understood by those skilled in the art, the above discussed SCR conversion process typically requires a controlled or metered amount of a reductant 54 having a general name of "diesel-exhaust-fluid" (DEF) when the reductant 54 is employed in diesel engines. Such a reductant 54 may be an aqueous solution of urea that includes water and ammonia. Accordingly, the AT system 30 also includes an injector 56 positioned in the exhaust passage 28A between the first AT device 32 and the second AT device 34. The injector 56 is configured to introduce a reductant 54, such as described above, into the exhaust gas flow 26 from a reservoir 57, as shown in FIGS. 1 and 3.

Figure 3:
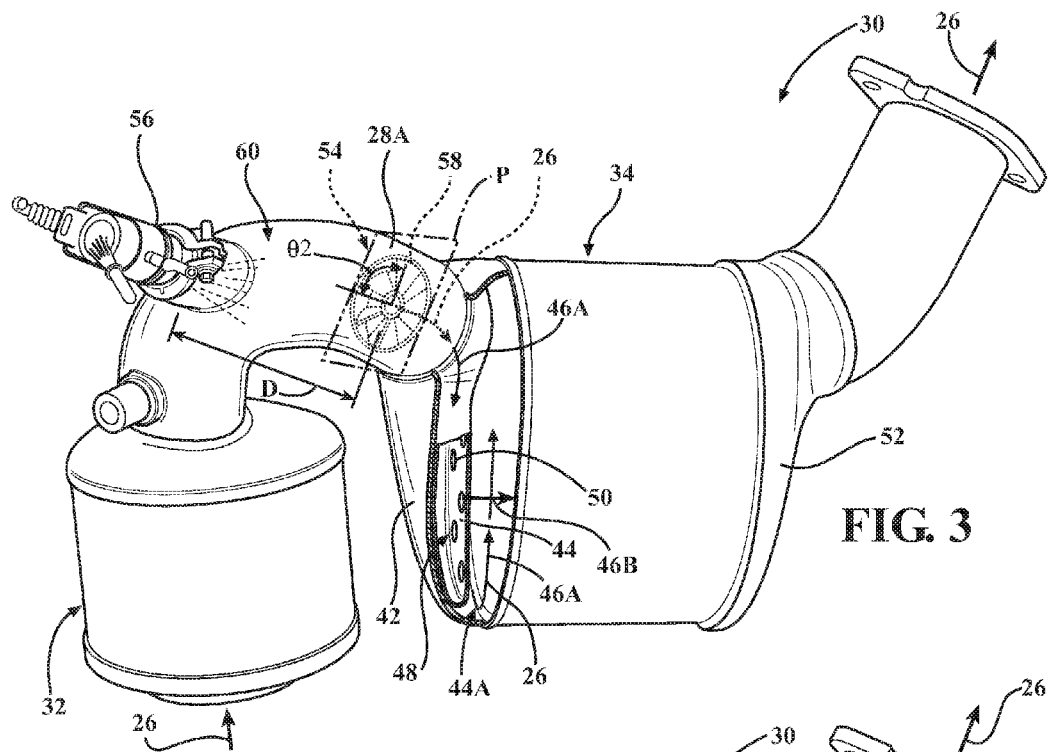
FIG. 3 is a schematic perspective partial cut-away view of the AT system shown in FIG. 1, illustrating a reductant injector and, in phantom, a mixer arranged upstream of an exhaust flow deflector forming a volute inside an inlet cone for one of the AT devices.

As additionally shown in FIG. 3, the AT system 30 can include a mixer 58. The mixer 58 can be configured as a swirl-type mixer (shown in FIGS. 3 and 4) or any other type of a mixing device constructed and arranged to break up reductant 54 droplets through impingement on the exhaust gas flow 26 downstream of the injector 56. The mixer 58 can be positioned within the exhaust passage 28A downstream of the injector 56 in a plane P and be configured to mix the reductant 54 with the exhaust gas flow 26. The plane P of the mixer 58 may be positioned perpendicular to the flow of the exhaust gas 26 within the exhaust passage 28A. As can be seen in FIGS. 2-5, the exhaust passage 28A includes an L-bend 60 intended to facilitate a compact, close-coupled package for the first and second AT devices 32, 34. The injector 56 can be positioned upstream of the L-bend 60 such that the reductant 54 is introduced along the flow of the exhaust gas 26 and at an angle θ2 to the plane P of the mixer 58, as shown in FIG. 3. The angle θ2 may be in the range of 40-90 degrees. Additionally, as shown in FIG. 3, the injector 56 can be positioned at a predetermined distance D from the mixer 58, which in a particular embodiment can be in the range of 70-150 mm, to facilitate appropriate coverage of the mixer surface with the reductant 54. Overall, the relative arrangement of the injector 56 and the mixer 58 is intended to facilitate a more efficient mixing of the reductant 54 with the exhaust gas flow 26.

The AT system 30 also includes a controller 62. The controller 62 may be a stand-alone unit, or be part of an electronic control unit (ECU) that regulates the operation of engine 12. The controller 62 is arranged on the vehicle 10 and includes a processor and a readily accessible non-transitory memory. Instructions for controlling operation of the AT system 30 are programmed or recorded in the memory of the controller 62 and the processor is configured to execute the instructions from the memory during operation of the vehicle 10. The controller 62 can also be programmed to regulate the injector 56 for introducing the reductant 54 into the exhaust gas flow 26 during operation of the engine 12.

Overall, the compact, close-coupled package of the first and second AT devices 32, 34 permitted by the relative position of the injector 56, the mixer 58, and the volute 44 facilitates rapid and efficent operation of the AT system 30 and activation of the AT system at engine 12 cold-start conditions. Additionally, when the disclosed construction of the second AT device 34 is used for the 1-way filter SCRF, the second AT device can facilitate more efficient filtering of particulate matter or soot. On the other hand, in the 2-way filter SCRF, the construction of the second AT device 34 as part of the AT system 30 that also includes the described arrangement of the injector 56 and the mixer 58, can additionally facilitate more efficient reduction of $NO_x$.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An after-treatment (AT) system for a flow of exhaust gas from an internal combustion engine, the AT system comprising:
   a first AT device;
   a second AT device in fluid communication with and positioned in the flow of exhaust gas downstream of the first AT device;
   an exhaust passage configured to carry the flow of exhaust gas from the first AT device to the second AT device;
   an injector configured to introduce a reductant into the exhaust passage; and
   a mixer positioned within the exhaust passage downstream of the injector and configured to mix the reductant with the flow of exhaust gas;
   wherein:
   the second AT device includes an inlet cone having a volute defining a spiral primary path for the flow of exhaust gas into the second AT device and configured to generate a swirling motion of and turbulence in the flow of exhaust gas;
   the exhaust passage includes an L-bend;
   the mixer is positioned in a plane square to the flow of exhaust gas within the exhaust passage; and
   the injector is positioned upstream of the L-bend such that the reductant is introduced along the flow of the exhaust gas and at an angle of 40-90 degrees with respect to the plane of the mixer.

2. The AT system of claim 1, wherein the volute is at least partially formed by a gas flow deflector arranged inside the inlet cone.

3. The AT system of claim 2, wherein the gas flow deflector is configured to extend inside the inlet cone for a span in a range of 60-300 degrees.

4. The AT system of claim 2, wherein the exhaust gas flow deflector defines an aperture configured to provide a secondary path for the flow of exhaust gas through the gas flow deflector and configured to generate additional turbulence in the flow of exhaust gas.

5. The AT system of claim 1, wherein the injector is positioned 90-130 mm from the mixer.

6. The AT system of claim 1, further comprising a controller configured to regulate the injector for introducing the reductant into the flow of exhaust gas.

7. The AT system of claim 1, wherein:
   the internal combustion engine is a compression-ignition engine;
   the reductant is a diesel-exhaust-fluid (DEF) having an aqueous solution of urea; and
   the first AT device is a diesel oxidation catalyst (DOC) and the second AT device is a selective catalytic reduction filter (SCRF).

8. A vehicle comprising:
an internal combustion engine configured to generate a flow of exhaust gas as a byproduct of generating power; and
an exhaust system connected to the engine and having an after-treatment (AT) system for the flow of exhaust gas, the AT system including:
a first AT device; and
a second AT device in fluid communication with and positioned in the flow of exhaust gas downstream of the first AT device;
an exhaust passage configured to carry the flow of exhaust gas from the first AT device to the second AT device;
an injector configured to introduce a reductant into the exhaust passage; and
a mixer positioned within the exhaust passage downstream of the injector and configured to mix the reductant with the flow of exhaust gas;
wherein:
the second AT device includes an inlet cone having a volute defining a spiral primary path for the flow of exhaust gas into the second AT device and configured to generate a swirling motion of and turbulence in the flow of exhaust gas;
the exhaust passage includes an L-bend;
the mixer is positioned in a plane square to the flow of exhaust gas within the exhaust passage; and
the injector is positioned upstream of the L-bend such that the reductant is introduced along the flow of the exhaust gas and at an angle of 40-90 degrees with respect to the plane of the mixer.

9. The vehicle of claim 8, wherein the volute is at least partially formed by a gas flow deflector arranged inside the inlet cone.

10. The vehicle of claim 9, wherein the exhaust gas flow deflector defines an aperture configured to provide a secondary path for the flow of exhaust gas through the gas flow deflector and configured to generate additional turbulence in the flow of exhaust gas.

11. The vehicle of claim 8, further comprising a controller configured to regulate the injector for introducing the reductant into the flow of exhaust gas.

12. The vehicle of claim 8, wherein:
the internal combustion engine is a compression-ignition engine;
the reductant is a diesel-exhaust-fluid (DEF) having an aqueous solution of urea; and
the first AT device is a diesel oxidation catalyst (DOC) and the second AT device is a selective catalytic reduction filter (SCRF).

* * * * *